Nov. 28, 1967 D. WIEBE ET AL 3,354,716
COMBINED RATE OF FLOW, PRESSURE AND TEMPERATURE GAGE
Filed Sept. 17, 1964 4 Sheets-Sheet 1
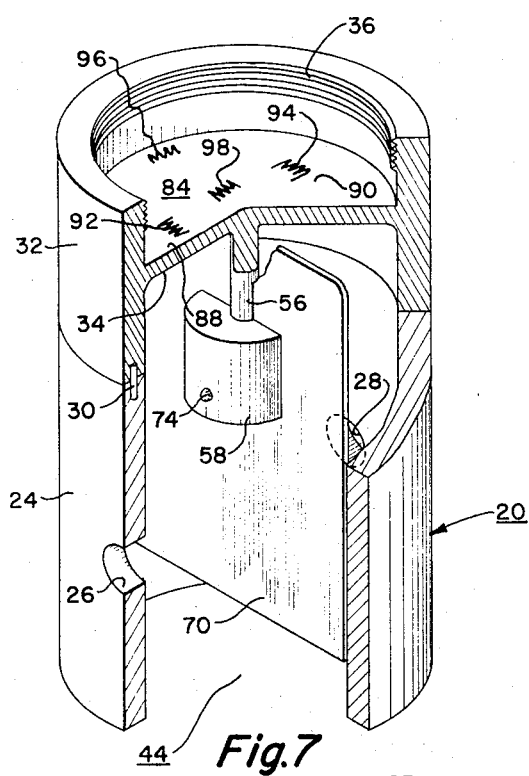
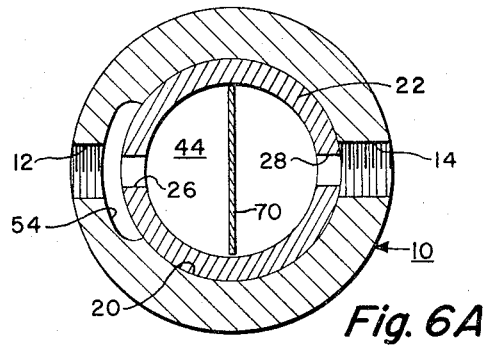
Fig. 6A
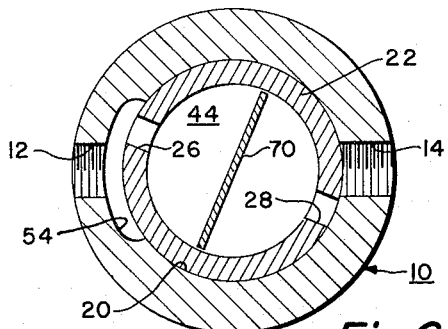
Fig. 6B
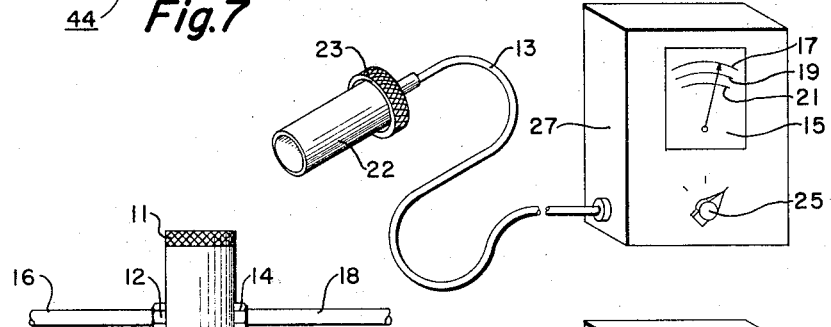
Fig. 1A
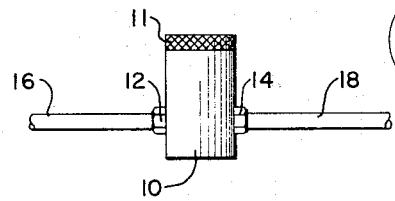
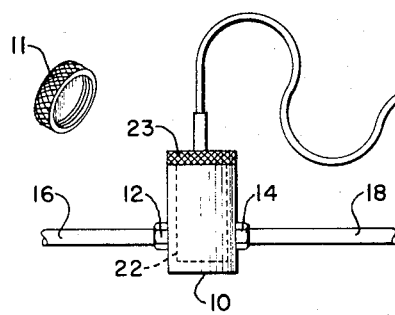
Fig. 1B
INVENTORS
DONALD WIEBE &
RICHARD B. DOORLEY
BY
ATTORNEY

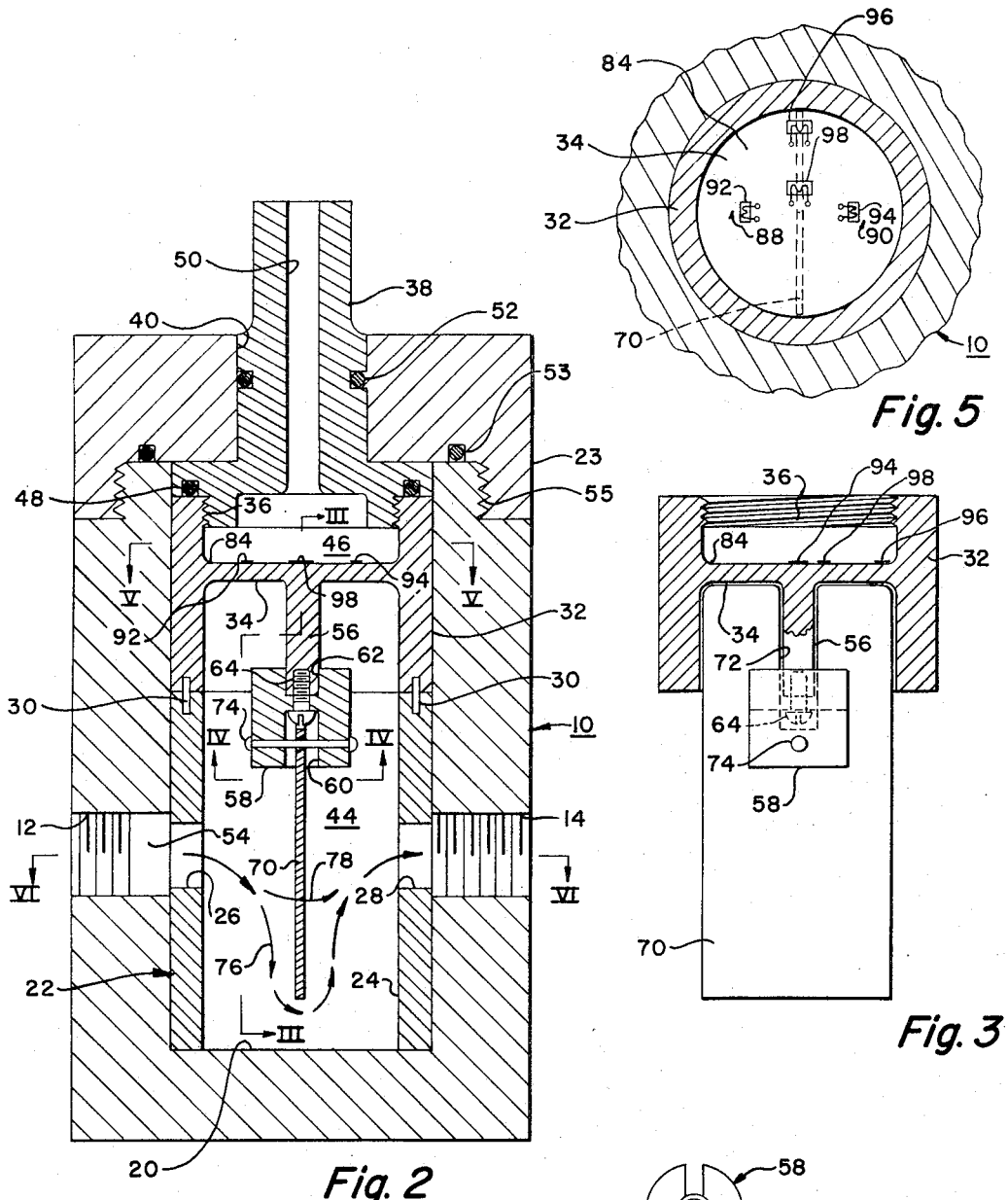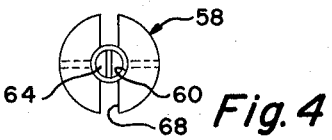

Nov. 28, 1967    D. WIEBE ET AL    3,354,716
COMBINED RATE OF FLOW, PRESSURE AND TEMPERATURE GAGE
Filed Sept. 17, 1964    4 Sheets-Sheet 3

INVENTORS
DONALD WIEBE &
RICHARD B. DOORLEY
BY
ATTORNEY

Nov. 28, 1967 D. WIEBE ET AL 3,354,716
COMBINED RATE OF FLOW, PRESSURE AND TEMPERATURE GAGE
Filed Sept. 17, 1964 4 Sheets-Sheet 4

INVENTORS
DONALD WIEBE &
RICHARD B. DOORLEY
BY
ATTORNEY

United States Patent Office 3,354,716
Patented Nov. 28, 1967

3,354,716
COMBINED RATE OF FLOW, PRESSURE AND TEMPERATURE GAGE
Donald Wiebe, Greensburg, and Richard B. Doorley, Pittsburgh, Pa., assignors to William S. Hansen, doing business as A. Stucki Company, Pittsburgh, Pa.
Filed Sept. 17, 1964, Ser. No. 397,171
20 Claims. (Cl. 73—198)

ABSTRACT OF THE DISCLOSURE

A unitary probe having four strain gages and a cantilever vane mounted on a wall of the probe. Displacement of the vane due to fluid flow is measured by two of the strain gages while another two sense pressure when the probe is adjusted to stop fluid flow. Temperature may be determined by appropriate connection of the gages into a strain gage bridge.

---

As is known, it is often difficult to locate the faulty part or parts of a hydraulic or other fluid circuit which is not functioning properly. Such fluid circuits usually consist of a pump, one or more fluid motors or cylinders driven by the pump, and a series of valves for controlling the flow of fluid between the pump and motors. If it should happen, for example, that the power delivered to a fluid motor decreases, the trouble may be due to malfunctioning of any one or more of the many parts of the fluid circuit. While it is possible to progressively dismantle the entire fluid circuit and individually test each part, this is obviously a cumbersome, time-consuming and expensive procedure, particularly when it is remembered that many fluid circuits are complicated and include components and conduits located at inaccessible points within a piece of equipment.

The location of a faulty part in a hydraulic circuit can be determined without dismantling the system by measuring the flow rate, pressure and temperature at various points in the system to isolate a particular faulty unit. In the past, portable circuit testers have been provided which can be connected into the system to determine the rate of flow, pressure and temperature at selected points. While such testers eliminate the necessity for complete dismantling of the system, they nevertheless require that conduits be disconnected at various points in order to connect the tester itself into the circuit. This is not only a cumbersome procedure, but also results in diversion of fluid flow through the tester which alters the characteristics of the fluid circuit.

As an overall object, therefore, the present invention seeks to provide apparatus in the form of a probe which can be inserted into a hydraulic circuit at selected points without requiring any dismantling for the purpose of measuring pressure, rate of flow and temperature.

Another object of the invention is to provide a fluid circuit which permanently incorporates closed cavities of inexpensive, simple construction at spaced points, which cavities can be opened for the reception of a probe which measures rate of flow, pressure and temperature.

Another object of the invention is to provide apparatus for measuring the temperature, rate of flow and pressure of the fluid within a conduit wherein the temperature measuring, pressure measuring, and rate of flow measuring devices are incorporated into a single unitary probe structure.

A further object of the invention is to provide a single unitary testing probe for hydraulic and other fluid circuits, which probe incorporates valve means for changing the pressure drop in the system and its components by restricting fluid passing through the tester.

Still another object of the invention is to provide a combined pressure and rate of flow tester employing resistance-type strain gages and wherein the gages are external to fluid within a hydraulic circuit being tested.

The above and other objects and features of the invention will become apparent from the following detailed description taken in connection with the accompanying drawings which form a part of this specification, and in which:

FIGURES 1A and 1B illustrate the manner in which the probe of the present invention may be inserted into a fluid conduit;

FIG. 2 is a cross-sectional view of one embodiment of the invention;

FIG. 3 is a broken-away cross-sectional view taken substantially along line III—III of FIG. 2;

FIG. 4 is a view taken substantially along line IV—IV of FIG. 2, but with the flow measuring vane removed;

FIG. 5 is a cross-sectional view taken along line V—V of FIG. 2 showing the positioning of the resistance-type strain gage devices employed to measure pressure and rate of flow;

FIGS. 6A and 6B are cross-sectional views taken along line VI—VI of FIG. 2 showing the manner in which the outlet port of the embodiment of FIG. 2 may be blocked without blocking the inlet port;

FIG. 7 is a broken-away perspective view of the cylindrical insert shown in FIG. 2;

Figure 8:
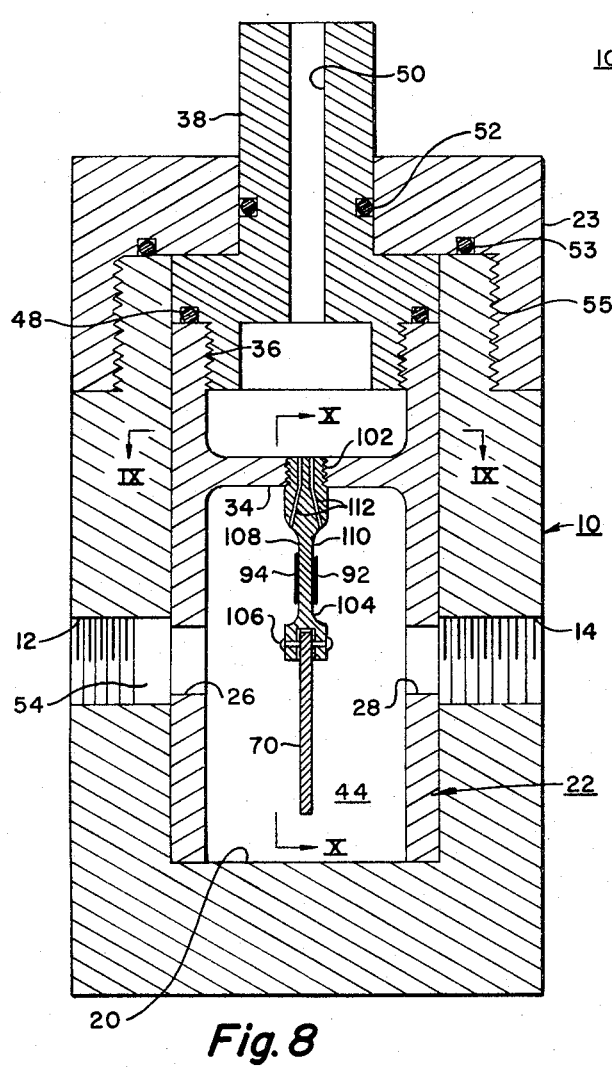
FIG. 8 is a cross-sectional view of another embodiment of the invention.

Referring now to the drawings, and particularly to FIGS. 1A and 1B, a generally cylindrical receptacle 10 is provided with inlet and outlet ports 12 and 14, respectively, adapted for connection to fluid conduits 16 and 18. As will be understood, the fluid conduits are included in a fluid circuit which, in the usual case, includes a pump, one or more fluid motors or cylinders, and valves for controlling the flow of fluid from the pump to the motors or cylinders. The receptacle 10 is permanently connected into the fluid circuit, and a plurality of such receptacles may be spaced at selected testing points throughout the circuit.

As will hereinafter be explained, one end of the receptacle is open and will receive cap 11 which prevents the escape of fluid from the receptacle under normal operating conditions. The cap 11, however, may be removed from the receptacle 10 when the fluid within the circuit is not under pressure, and a generally cylindrical testing probe 22 inserted therein. The probe 22 is provided, as shown with a cap 23 which may be threaded onto the open end of the receptacle 10 to seal the probe within the receptacle and hold it in place. If desired, caps 11 could be provided on either end of the receptacle 10 to facilitate insertion of probe 22 into either end.

As will be seen, the probe 22 includes means, preferably in the form of resistance-type strain gages, for measuring both the pressure and rate of flow of fluid passing through conduits 16 and 18, as well as its temperature. The strain gages are connected through a cable 13 to a meter 15 having three dials or graduations thereon. One dial 17 is calibrated to indicate pressure; another dial 19 is calibrated to indicate flow rate; and the third 21 is calibrated to indicate temperature. By selectively adjusting a knob 25 on the meter housing 27 for a temperature, pressure or rate of flow setting, any one of these factors may be observed from the position of the pointer on the meter. In FIG. 1A, the apparatus is shown with the cap on receptacle 10; while in FIG. 1B, the cap 11 is removed and the probe 22 inserted, with cap 23 holding it in place.

As best shown in FIG. 2, the cylindrical receptacle 10 is provided with an interior cylindrical cavity 20 which is open at one end. Received within the cavity 20 is the cylindrical probe 22 which is perhaps best shown in FIG. 7. It comprises a lower skirt portion 24 having inlet and outlet ports 26 and 28, respectively, adapted to register with the inlet and outlet ports 12 and 14 in the cylindrical receptacle 10. Secured to the lower skirted portion 24 by means of pins 30 or other suitable fastening means is an upper cylindrical portion 32 having formed therein an integral circular wall 34. The upper inner peripheral surface of the portion 32 is threaded as at 36 to receive a cap integral with a stub shaft 38 (FIG. 2) which extends through a bore 40 in the cap 23 threadedly received over the open end of the receptacle 10.

With the arrangement shown, a fluid chamber 44 is formed between the lower surface of wall 34 and the lower end wall of the cavity 20. This chamber 44 communicates with the inlet and outlet ports 12 and 14. Consequently, if fluid is flowing between conduits 16 and 18, the entire chamber 44 will be filled with fluid. Above the wall 34 is a second chamber 46 which is isolated from chamber 44 by means of an O-ring seal 48 provided in an annular slot in the shaft 38. The chamber 46, in turn, communicates with the atmosphere through an axial bore 50 in the shaft 38. Although not shown in FIG. 2, the cable 13 extends through bore 50 for connection to resistance-type strain gages, hereinafter described. Fluid in chamber 44 is prevented from escaping around the edges of probe 22 and out through the bore 40 by means of an O-ring seal 52 carried within a cooperating annular slot formed in the outer periphery of the shaft 38. Similarly, an O-ring seal 53 prevents the escape of fluid through threads 55 on the upper end of receptacle 10 which recive cap 23 or cap 11, as the case may be.

With the arrangement just described, the probe 22 may be rotated within the cylindrical cavity 20 by applying torque to the portion of shaft 38 extending through the cap 23. As best shown in FIGS. 6A and 6B, the wall of the cavity 20 adjacent inlet port 12 is provided with a slot or plenum chamber 54, which will permit limited rotation of the probe 22 with respect to the receptacle 10 without disconnecting the inlet ports 12 and 26 and with sufficient plenum size to insure radial flow symmetry through port 26. At the same time, the outlet port 14 is not provided with a similar countersunk portion such that by rotating the insert 22 within receptacle 10 through a short arc, valve action is obtained whereby the outlet ports 14 and 28 can be disconnected while the inlet port 26 is still connected to the conduit 16. As will be seen, this facilitates measuring the static pressure of fluid within the conduit 16 and also enables partial restriction of fluid through the circuit to build up the pressure therein while still permitting fluid flow therethrough. At the same time, provision of the slot or countersunk portion in the wall of cavity 20 insures that the fluid, in flowing through inlet port 26 will always strike the surface of vane 70, hereinafter described, at right angles regardless of the angular position of probe 22 within receptacle 10. In FIG. 6A, free fluid flow is permitted through chamber 44 between ports 12 and 14. In FIG. 6B, the probe 22 has been rotated to disconnect outlet ports 14 and 28 while inlet port 12 is still connected to port 26 through countersunk portion 54 to enable measurement of static pressure.

Integrally formed with the wall 34 is a depending stub shaft 56 which carries, at its lower extremity, a cylindrical member 58. As best shown in FIGS. 2, 3 and 4, the cylindrical insert 58 is provided with a pair of opposed bores 60 and 62. The bore 62 fits over the lower extremity of the stub shaft 56; while the bore 60 receives a screw 64 which extends through the member 58 and is threaded into the stub shaft 56, thereby securing the member 58 to the shaft 56. Also formed in the cylindrical member 58, as best shown in FIG. 4, is a transverse slot 68 which receives a flat vane 70. The flat vane 70 is provided with a cutout portion 72 (FIG. 3) which enables it to be fitted into the slot 68. Finally, the vane 70 is held within the slot 68 by means of a rivet 74 or other suitable fastening means.

As is best shown in FIGS. 3 and 7, the width of the vane 70 is slightly less than the inner peripheral diameter of the skirted portion 24; and the vane extends downwardly into the chamber 44 beneath the inlet and outlet ports 26 and 28. There is, however, sufficient space beneath the lower edge of the vane 70 and the bottom of the cylindrical cavity 20 to facilitate the flow of the major portion of the fluid between the inlet and outlet ports 26 and 28 along the approximate path of the arrows 76 in FIG. 2. When the fluid from inlet port 26 thus impinges on the left face of vane 70 as viewed in FIG. 2, and exerts viscous drag along the bottom of vane 70, it will deflect the vane in a counterclockwise direction as illustrated by the arrow 78 in FIG. 2.

With specific reference, now, to FIGS. 2, 3, 5 and 7, deflection in the vane 70 will effect tensile stresses at area 88 and compressive stresses at area 90. Secured to the areas 88 and 90 are a pair of resistance-type strain gages 92 and 94. Strain gages 92 and 94 can assume any location on surface 84 as long as one gage measures strain opposite to that experienced by the other. As will hereinafter be explained, the strain gages 92 and 94 are connected in a bridge circuit arrangement to indicate the deflection in elements 70 and 56 as reflected in the tensile and compressive stresses in a radial direction on surface 84 at areas 88 and 90 to indicate the rate of flow of fluid through conduits 16 and 18. Although the flow meter portion of the invention will operate with a single one of the gages 92 or 94, the use of two gages as shown provides temperature compensation and larger output.

In order to measure the pressure of the fluid within chamber 44, a second pair of strain gages 96 and 98 (FIG. 5) are secured near the edge and near the center of surface 84. In this respect, it is apparent that the wall 34 functions as a diaphragm which is deflected upwardly by the pressure within the chamber 44, the greater the pressure the more the deflection. In response to pressure beneath wall 34, the area beneath strain gage 98 will be placed in tension and that beneath strain gage 96 placed in compression to produce an additive effect and temperature compensation as will be more fully explained. The strain gages 92, 94, 96 and 98 are connected through the cable 13 (FIGS. 1A and 1B) which passes through bore 50 to the aforesaid bridge circuits, hereinafter described in detail. In this respect, it will be appreciated that none of the strain gages are within the fluid chamber 44. This is a distinct advantage with this embodiment of the invention in that no problems are encountered in providing sealing means around electrical leads passing into the chamber 44 or physically protecting the strain gages from fluid effects, particularly when high pressures are encountered.

While the specific arrangement of flat surfaces 84 and 34 is shown herein for purposes of illustration, it should be understood that other and different arrangements of surface contour can be utilized in accordance with the invention for the purpose of obtaining areas of stress concentration in the upper surface of wall 34 in response to torque applied to vane 70. In all cases, however, the flow-rate measuring strain gages 92 and 94 will be at the areas of torque-responsive stress concentration.

Figure 9:
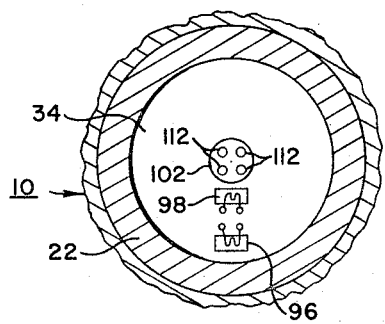
FIG. 9 is a cross-sectional view taken substantially along line IX—IX of FIG. 8 showing the positioning of the pressure-measuring strain gages of the embodiment of FIG. 8.
Figure 10:
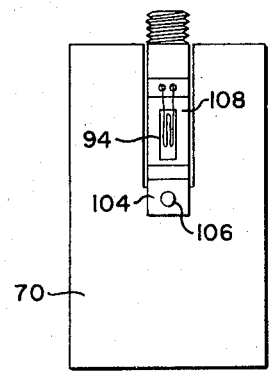
FIG. 10 is a view taken substantially along line X—X of FIG. 8 showing the positioning of the flow-measuring strain gage elements utilized in the embodiment of FIG. 8.

With reference now to FIGS. 8, 9 and 10, another embodiment of the invention is shown which is similar in construction to that shown in FIGS. 2–7. Accordingly, elements in FIGS. 8, 9 and 10 which correspond to those shown in FIGS. 2–7 are identified by like reference numerals. In this case, however, the diaphragm wall 34 is provided with a tapped bore 102 which receives the threaded upper portion of a downwardly-depending stub shaft 104. Carried within a slot in the lower end of the stub shaft 104 is the vane 70, the vane being secured within the slot by means of a rivet 106 or other suitable fastening means.

Instead of providing flow-measuring strain gage devices outside of the chamber 44, the strain gages 92 and 94 in this case are on opposite, flattened surfaces 108 and 110 of the stub shaft 104. Electrical leads for the strain gages 92 and 94 then pass upwardly through holes 112 in shaft 104, which holes are filled with an epoxy resin or the like to prevent escape of the fluid from the chamber 44. Aside from the positioning of the flow-measuring strain gages, however, the operation of the embodiment of FIGS. 8–10 is the same as that previously described.

Figure 11A:
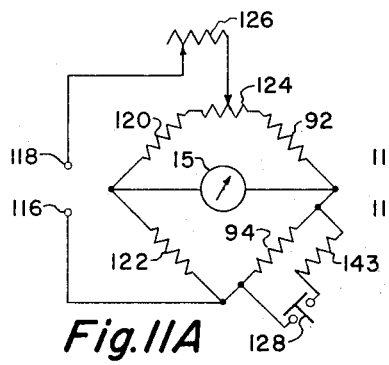
FIGS. 11A–11C illustrate equivalent bridge circuit arrangements in accordance with the invention for measuring pressure, flow rate and temperature.
Figure 11B:
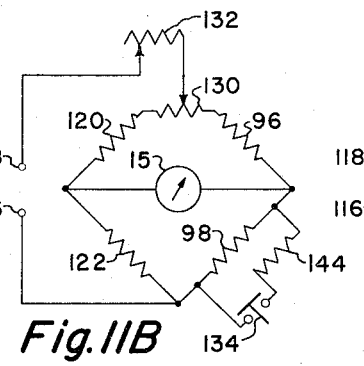
Figure 11C:
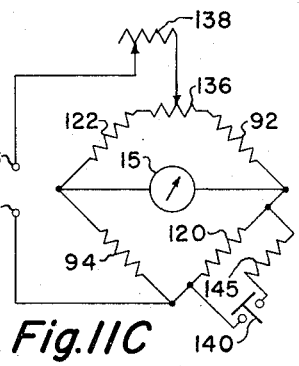

Referring to FIGS. 11A–11C, three circuit diagrams are illustrated for measuring flow rate, pressure and temperature, respectively.

In FIG. 11A, for example, a bridge circuit arrangement is illustrated for measuring flow rate. It includes the two strain gages 92 and 94 connected in series between input terminals 116 and 118 adapted for connection to a source of driving potential, not shown. Also connected in series between the input terminals 116 and 118 are a pair of strain gages 120 and 122 external to the probe 22 and affixed to a piece of metal positioned, for example, within the meter housing 27. The bridge circuit may be initially balanced by means of rheostat 124; and the meter initially calibrated for a given flow rate by means of rheostat 126 which can be selectively adjusted to a given indicator reading while placing a fixed resistor 143 in parallel with strain gage 94 by means of switch 128.

The meter 15, comprising a galvanometer, is connected between the junction of gages 120, 122 and the junction of gages 92, 94, substantially as shown, to complete the bridge circuit. As will be appreciated, the bridge circuit will be balanced and no current will flow through the meter 15 when the ratio of the impedance of element 92 and part of element 124 with respect to element 94 is equal to that of element 120 and the remaining portion of element 124 with respect to element 122. Thus, the bridge will be balanced when:

$$\frac{R92+C(R124)}{R94}=\frac{R120+(1-C)(R124)}{R122}, C<1$$

where R92, R94, R120 and R122 are the instantaneous resistance values of gages 92, 94, 120 and 122, respectively. R124, the balancing resistor, is assumed small compared to the four principal resistors in the bridge. Since strain gage 92 is placed in tension under flow conditions while strain gage 94 is placed in compression, their combined tension and compression strains are cumulative in their action on the bridge, thereby increasing the sensitivity considerably beyond what would be obtained with only a single strain gage on wall 34. Another advantage of the two-gage arrangement is that they compensate for temperature changes. Thus, if the temperature of the probe should increase, the wall 34 will expand and the conductivity of the gage wire filaments will change but the net impedances of strain gages 92 and 94 will change in the same amount, the same holds true for the pressure effect, thereby maintaining the same ratio between the two such that the bridge circuit remains balanced and will respond only to deflections in the vane 70. The same is true of gages 120 and 122 affixed to a piece of metal within housing 27 (FIGS. 1A and 1B) at room temperature.

In FIG. 11B the equivalent bridge circuit arrangement for pressure readings is shown wherein elements corresponding to those shown in FIG. 11A are identified by like reference numerals. In this case, however, the series arrangement of pressure strain gages 96 and 98 is connected in parallel with the series combination of strain gages 120 and 122. Thus, the reading on meter 15 will be responsive to pressure rather than flow rate. The bridge is initially balanced by rheostat 130 and calibration effected by elements 132 and 134 and 144 in the manner described in connection with FIG. 11A. Again, by virtue of the positioning of the strain gages 96 and 98, one will be in compression and one will be in tension, thereby providing a cumulative effect on the bridge circuit while at the same time compensating for temperature variations since the ratio of the impedance of element 96 with respect to element 98 will remain constant as long as the expansion or contraction in the two is the same as a result of temperature variations.

In FIG. 11C, the equivalent bridge circuit configuration for temperature measurements is shown wherein elements corresponding to those shown in FIGS. 11A and 11B are again identified by like reference numerals. In this case, however, the strain gages 120 and 122 external to the probe 22 are in opposing legs of the bridge circuit, as are the flow-measuring strain gages 92 and 94. The bridge is initially balanced by rheostat 136, and calibration effected by elements 138 and 140. The strain gages 120 and 122 will be at ambient temperature (i.e., room temperature). The strain gages 92 and 94, however, will be responsive to the temperature of the fluid within the chamber 44. Now the bridge will be balanced only when:

$$\frac{R92+C(136)}{R120}=\frac{R122+(1-C)(136)}{R94}, C<1$$

and again the resistance of element 136 is small compared to the remaining bridge elements. Let us assume, for example, that the temperature of fluid within the chamber 44 increases. Under these circumstances, the impedances R92 and R94 of the strain gages 92 and 94 will be assumed to increase. This unbalances the bridge, and the unbalance is again cumulative. At the same time, changes in the flow rate, for example, will not affect the bridge circuit configuration of FIG. 11C since an increase in the impedance R92 of element 92 due to an increase in the flow rate, for example, will be compensated for by an equal and opposite decrease in the impedance R94 of the element 94. The bridge circuit configuration of FIG. 11C, therefore, is responsive only to temperature variations or differences between the meter and the flow measuring element. As will be understood, the strain gages 92 and 94 could be replaced by the pressure responsive strain gages 96 and 98 if desired with equal effectiveness.

Figure 12:
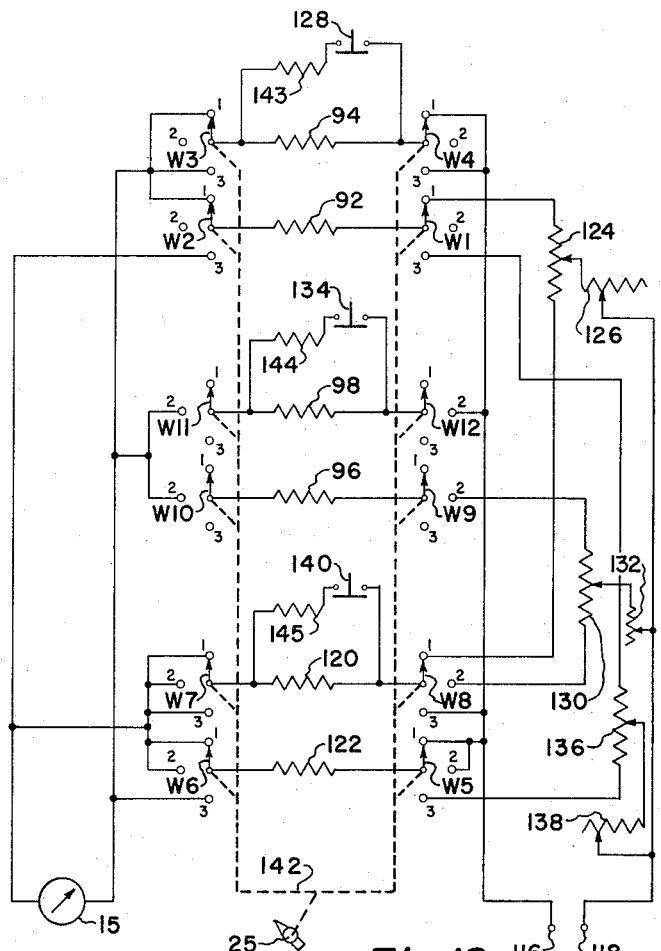
FIG. 12 is a schematic diagram of the actual circuitry including switches utilized in accordance with the invention for measuring temperature, fluid flow and pressure.

In FIG. 12 the switching arrangement for effecting the equivalent bridge circuits shown in FIGS. 11A, 11B and 11C is illustrated. It includes a rotary switch element having a plurality of movable wipers W1–W12 thereon mechanically interconnected as by a common shaft schematically illustrated by the reference numeral 142 and connected to dial 25 such that all of the wipers will be on their No. 1, No. 2 or No. 3 contact simultaneously.

With the wipers in the position shown in FIG. 12 wherein they are connected to the No. 1 contacts, the flow measuring bridge circuit arrangement of FIG. 11A is effected. Thus, input terminal 118 is connected through rheostat 126, 124 and wiper W1 to the strain gage 92. The other end of the strain gage 92 is connected through wiper W2 to one input terminal of the meter 15 and through wiper W3 to one end of the strain gage 94. The other end of the strain gage 94 is then connected through wiper W4 to input terminal 116. At the same time, the external strain gages 120 and 122 are connected between input terminals 116 and the rheostat 124 through wipers W5, W6, W7 and W8. This, in effect, completes the bridge circuit arrangement of FIG. 11A.

To effect the pressure measuring bridge circuit arrangement of FIG. 11B, all of the wipers are moved to their No. 2 contacts. Under these circumstances, strain gages 92 and 94 are disconnected from the circuit, while strain gages 96 and 98 are connected into the circuit through wipers W9, W10, W11 and W12. Thus, with the wipers on the No. 2 contacts, a circuit is completed from input terminal 118 to rheostats 132, 130, wiper W9, strain gage 96, wiper W10 to one input terminal of meter 15. This same terminal of meter 15 is connected through wiper W11, strain gage 98 and wiper W12 to input terminal 116. The connections of the strain gages 120 and 122 to the meter 15 are the same as before; however their opposing ends are now connected through wipers W5 and and W8 to input terminal 116 and rheostat 130, respectively, rather than rheostat 124.

In order to measure temperature, the wipers are moved to their No. 3 contacts, in which case the rheostats 138 and 136 are connected in a bridge circuit arrangement with elements 92, 94, 120 and 122 to effect the equivalent circuit of FIG. 11C.

Figure 13:
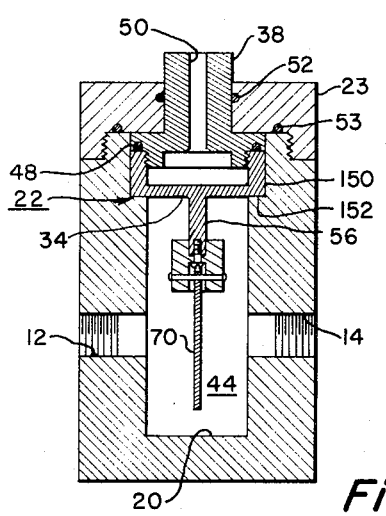
FIG. 13 is a cross-sectional view of an alternative embodiment of the invention which does not incorporate means for controlling the pressure drop in the system.

With reference, now to FIG. 13, a still further embodiment of the invention is shown wherein the annular skirt portion 24 is eliminated. The probe 22 in this case simply comprises a cup-shaped upper portion 150 which rests on a shoulder 152 formed in the receptacle 10. In this case, of course, the probe is not rotatable within the chamber 44, nor is it possible to vary the pressure drop within the system. An arrangement such as that shown in FIG. 13 may be used, for example, as a permanent insert into a fluid circuit for the purpose of continually measuring dynamic pressure, flow rate and/or temperature.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a hydraulic circuit, a normally closed receptacle having inlet and outlet ports permanently connected to the hydraulic circuit such that fluid in the circuit will flow through said receptacle, cap means on said receptacle which may be removed to expose the interior of the receptacle, a testing probe insertable into said receptacle with the cap means removed for measuring a characteristic of the fluid in the circuit, and means on the testing probe for controlling the rate of fluid flow through said receptacle.

2. In a hydraulic circuit, a normally closed generally cylindrical receptacle having inlet and outlet ports in its walls permanently connected to the hydraulic circuit such that fluid in the circuit will flow through said receptacle, cap means on one end of said cylindrical receptacle which may be removed to expose the interior of the receptacle, and a testing probe insertable into said receptacle with the cap means removed for measuring a characteristic of the fluid within the hydraulic circuit, said testing probe including a generally cylindrical skirt portion rotatable within said receptacle and having inlet and outlet ports in its walls adapted to selectively register with the inlet and outlet ports of said receptacle whereby fluid flow through the skirt portion may be controlled by rotation of the skirt portion within the cylindrical receptacle, and means carried on said probe for determining a characteristic of the fluid within said hydraulic circuit.

3. The combination of claim 2 wherein the means carried on said probe for determining a characteristic of the fluid comprises a device for measuring rate of fluid flow in said hydraulic circuit.

4. The combination of claim 2 wherein the means carried on said probe for determining a characteristic of the fluid comprises a device for measuring the pressure of the fluid within said hydraulic circuit.

5. The combination of claim 2 wherein the means carried on said testing probe for determining a characteristic of the fluid comprises a device for measuring the temperature of the fluid within said hydraulic circuit.

6. In a hydraulic circuit, a normally closed generally cylindrical receptacle having inlet and outlet ports in its wall permanently connected to the hydraulic circuit such that fluid in the circuit will flow through said receptacle, cap means on one end of said cylindrical receptacle which may be removed to expose the interior of the receptacle, and a testing probe insertable into said receptacle with the cap means removed for measuring both the pressure within the hydraulic circuit as well as the rate of fluid flow therein, said testing probe including a generally cylindrical skirt portion rotatable within said receptacle and having inlet and outlet ports in its walls adapted to selectively register with the inlet and outlet ports of said receptacle whereby fluid flow through the skirt portion may be controlled by rotation of the skirt portion within the cylindrical receptacle, vane-type fluid flow measuring means incorporated into said probe for measuring the rate of fluid flow between said inlet and outlet ports, and diaphragm-type pressure measuring means incorporated into said probe for measuring the pressure of the fluid within said hydraulic circuit.

7. The combination of claim 6 wherein said skirt portion is provided with a stub shaft which projects out of said receptacle with the skirt portion inserted therein, and annular cap means surrounding said stub shaft portion for sealing the skirt portion, the flow measuring and the pressure measuring means within the receptacle while permitting rotation of the skirt portion by application of torque to said stub shaft portion.

8. A device for measuring both the fluid flow within a conduit as well as the pressure therein, comprising a chamber having inlet and outlet ports adapted for connection to a conduit such that fluid passing through the conduit will flow into the chamber through the inlet port and out through the outlet port, a wall in said chamber, said wall extending generally parallel to the direction of fluid flow through the chamber, an element rigidly fixed to said wall and extending into said chamber at generally right angles to the flow of fluid therethrough whereby the element will be deflected by fluid flowing between the inlet and outlet ports, first strain gage means secured to the side of the wall opposite said element for measuring deflection in said element and hence the rate of fluid flow through said chamber, and second strain gage means secured to said side of the wall opposite said element for measuring deflection in said wall and hence the pressure within the chamber.

9. A device for measuring both the fluid flow within a conduit as well as the pressure therein, comprising a chamber having inlet and outlet ports adapted for connection to a conduit such that fluid passing through the conduit will flow into the chamber through the inlet port and out through the outlet port, a wall at one end of said chamber, said wall extending generally parallel to the direction of fluid flow through the chamber, a cantilever vane having one end rigidly fixed to said wall and an unsupported end projecting into the interior of said chamber at generally right angles to the flow of fluid therethrough whereby the vane will be deflected by fluid flowing between the inlet and outlet ports, resistance-type strain gage means in contact with said wall for measuring deflection in said vane and hence the rate of fluid flow through said chamber, and resistance-type strain gage means in contact with said wall for measuring deflection in said wall along the axis of said vane and hence the pressure within the chamber.

10. A device for measuring fluid flow within a conduit, comprising a chamber having inlet and outlet ports adapted for connection to a conduit such that fluid passing through the conduit will flow into the chamber through the inlet port and out through the outlet port, a wall at one end of said chamber, said wall extending generally parallel to the direction of fluid flow through the chamber, a cantilever vane having one end rigidly fixed to said wall and an unsupported end projecting into the interior of said chamber at generally right angles to the flow of fluid therethrough whereby the vane will be deflected by fluid flowing between the inlet and outlet ports, means incorporated into said wall for providing areas of stress concentration in response to deflection of said vane when fluid flows through said chamber, and resistance-type strain gage means in contact with said areas of stress concentration for measuring deflection in said vane and hence the rate of fluid flow through said chamber.

11. A device for measuring both the rate of fluid flow within a conduit as well as the pressure therein, comprising a chamber having inlet and outlet ports adapted for connection to a conduit such that fluid passing through the conduit will flow into the chamber through the inlet port and out through the outlet port, a wall at one end of said chamber, said wall extending generally parallel to the flow of fluid through the chamber, a cantilever vane having one end rigidly fixed to said wall and an unsupported end projecting into the interior of said chamber at generally right angles to the flow of fluid therethrough whereby the vane will be deflected by fluid flowing between the inlet and outlet ports, a first pair of resistance-type strain gage devices on the side of the wall opposite said vane and spaced along a line extending parallel to the flow of fluid through the chamber, bridge circuit means operatively connected to said first pair of strain gage devices for indicating deflection in said vane and hence the rate of flow of fluid through said chamber, a second pair of resistance-type strain gage devices secured to said side of the wall opposite the cantilever vane, and bridge circuit means operatively connected to said second pair of strain gage devices for indicating deflection in the wall and hence the pressure within the chamber.

12. A device for measuring both the fluid flow within a conduit as well as the pressure therein, comprising a generally cylindrical receptacle having inlet and outlet ports in its walls adapted for connection to a hydraulic circuit, a hollow cylindrcial insert received within said receptacle and having inlet and outlet ports in its walls adapted to register with the ports in said receptacle, said hollow cylindrical insert having an integral generally circular wall at one end thereof, a cantilever vane having one end rigidly fixed to said circular wall and an unsupported end projecting into the interior of said hollow cylindrical insert at generally right angles to the flow of fluid between the inlet and outlet ports in the walls of said insert, first strain gage means on said circular wall and responsive to deflection in said wall for measuring the pressure within said hollow cylindrical insert, and second strain gage means on said circular wall and responsive to deflection of said vane for measuring the rate of fluid flow between said inlet and outlet ports.

13. A device for measuring both the fluid flow within a conduit as well as the pressure therein, comprising a generally cylindrical receptacle having inlet and outlet ports in its walls adapted for connection to a hydraulic circuit, a hollow cylindrical insert received within said receptacle and having inlet and outlet ports in its walls adapted to register with the ports in said receptacle, said outlet ports being of generally the same cross-sectional area and one of said inlet ports being of larger cross-sectional area than the other inlet port whereby the cylindrical insert may be rotated to block fluid flow between said outlet ports without disconnecting said inlet ports, said hollow cylindrical insert having an integral generally circular wall at one end thereof, a cantilever vane having one end rigidly fixed to said circular wall and an unsupported end projecting into the interior of said hollow cylindrical insert at generally right angles to the flow of fluid between the inlet and outlet ports in the walls of said insert, first strain gage means on said circular wall and responsive to deflection in said wall for measuring the pressure within said hollow cylindrical insert, and second strain gage means on said circular wall and responsive to deflection of said vane for measuring the rate of fluid flow between said inlet and outlet ports.

14. The device of claim 13 wherein the cantilever vane is generally rectangular, is coaxial with the axis of said cylindrical insert, and has a width slightly smaller than the inner diameter of said cylindrical insert.

15. The device of claim 13 wherein the cylindrical insert has a projection extending beyond said integral generally circular wall, and a generally annular cap surrounding said projection for holding the cylindrical insert within said cavity and for hydraulically sealing the cylindrical insert within said cavity.

16. A device for measuring the rate of fluid flow within a conduit as well as the pressure and temperature of the fluid therein, comprising fluid-flow measuring means having a first pair of resistance-type strain gage devices thereon and responsive to the flow of fluid through said conduit, diaphragm means having a second pair of resistance-type strain gage devices thereon and responsive to pressure within said conduit, a third pair of resistance-type strain gage devices positioned external to said fluid conduit, first bridge circuit means adapted for connection to said first and third pairs of strain gage devices for indicating the rate of fluid flow through said conduit, second bridge circuit means adapted for connection to said second and third pairs of strain gage devices for indicating the pressure of the fluid within said conduit, and third bridge circuit means adapted for connection to said third pair of strain gage devices and one pair of said first and second pairs of strain gage devices for indicating the temperature of the fluid within said conduit.

17. The device of claim 16 including switch means for selectively interconnecting said first, second and third pairs of strain gage devices to effect said first, second and third bridge circuit means.

18. A device for measuring both the fluid flow within a conduit as well as the pressure therein, comprising a chamber having inlet and outlet ports adapted for connection to a conduit such that fluid passing through the conduit will flow into the chamber through the inlet port and out through the outlet port, diaphragm means in one wall of the chamber arranged such that the pressure of the fluid within the chamber will cause deflection in the diaphragm means, means for measuring deflection in said diaphragm means and hence the pressure within the chamber, a cantilever vane having one end rigidly fixed centrally to said diaphragm means and an unsupported end projecting into the interior of said chamber at generally right angles to the flow of fluid therethrough whereby the vane will be deflected by fluid flowing between the inlet and outlet ports, and means associated with said diaphragm means for measuring deflection in said vane and hence the rate of fluid flow through said chamber.

19. In a hydraulic circuit, a normally closed receptacle having inlet and outlet ports permanently connected to the hydraulic circuit such that fluid in the circuit will flow through said receptacle, cap means on said receptacle which may be removed to expose the interior of the receptacle, a testing probe insertable into said receptacle with the cap means removed for measuring a characteristic of the fluid in the circuit, spaced wall portions on the testing probe, passageways in the spaced wall portions, and means for moving the flow control member within the hollow housing member to thereby move the passageways in said spaced wall portions into and out of registry with said inlet and outlet ports to thereby vary the rate of fluid flow between the inlet and outlet ports.

20. A device for sensing characteristics of a fluid circuit comprising a hollow housing member having inlet and outlet ports adapted for connection to a fluid circuit such that fluid can flow through the housing, a flow control member within the housing member and having spaced wall portions, passageways in the spaced wall portions, means for moving the flow control member within the hollow housing member to thereby move the passageways in said spaced wall portions into and out of registry with said inlet and outlet ports to thereby vary the rate of fluid flow between the inlet and outlet ports, and a fluid characteristic sensing element positioned within said housing member.

References Cited

UNITED STATES PATENTS

| | | | |
|---|---|---|---|
| 1,683,743 | 9/1928 | Thompson | 73—345 |
| 1,917,317 | 7/1933 | Nacey | 73—228 |
| 2,400,467 | 5/1946 | Ruge | 73—398 |
| 2,420,148 | 5/1947 | Ostergren | 73—398 |
| 2,658,434 | 11/1953 | Miller | 73—40.5 |
| 2,952,753 | 9/1960 | Kmiecik et al. | 73—228 |
| 2,989,866 | 6/1961 | Widell et al. | 73—228 |

FOREIGN PATENTS 451,816   2/1913   France.

LOUIS R. PRINCE, *Primary Examiner.*

F. SHOON, *Assistant Examiner.*